(12) United States Patent
Frederick et al.

(10) Patent No.: US 6,304,016 B1
(45) Date of Patent: Oct. 16, 2001

(54) ALTERNATOR MOUNTING BRACKET

(75) Inventors: Dean Mark Frederick, Clinton; Robert Keith Runkle, Ypsilanti; Shawn Harold Swales, Canton, all of MI (US)

(73) Assignee: Ford Global Tech., Inc., Dearborn, MI (US)

(*) Notice: Subject to any disclaimer, the term of this patent is extended or adjusted under 35 U.S.C. 154(b) by 0 days.

(21) Appl. No.: 09/490,171

(22) Filed: Jan. 22, 2000

(51) Int. Cl.[7] ............................... H02K 5/24; H02K 7/18
(52) U.S. Cl. .................. 310/91; 123/195 A; 248/674; 248/205.1
(58) Field of Search ................... 310/51, 91; 123/195 A, 123/198 E, 198 R; 248/205, 1, 674, 675

(56) References Cited

U.S. PATENT DOCUMENTS

| | | | |
|---|---|---|---|
| 4,253,634 | * 3/1981 | Daniels | 310/91 X |
| 4,849,665 | 7/1989 | Kitamura et al. | 310/68 D |
| 5,065,713 | 11/1991 | Seats | 123/195 A |
| 5,203,293 | 4/1993 | Shintani et al. | 123/195 A |
| 5,210,453 | 5/1993 | Nelson | 310/51 |
| 5,686,773 | 11/1997 | Sakakibara et al. | 310/91 |

* cited by examiner

*Primary Examiner*—Nicholas Ponomarenko
*Assistant Examiner*—Judson H. Jones
(74) *Attorney, Agent, or Firm*—Ford Global Tech., Inc.

(57) ABSTRACT

An mounting bracket 50 which attaches an alternator 18 to a vehicle engine 14 and which substantially reduces the amount of noise which is produced by the alternator 18 as the engine is idling.

20 Claims, 2 Drawing Sheets

ALTERNATOR MOUNTING BRACKET

FIELD OF THE INVENTION

This invention relates to an alternator mounting bracket and more particularly to an alternator mounting bracket which operatively mounts or positions an alternator upon a vehicle engine and which concomitantly and substantially reduces the amount of noise which is emitted from the alternator during the idling of the engine.

BACKGROUND OF THE INVENTION

An alternator is used within a vehicle to selectively provide electrical current to various components and/or assemblies which are contained within the vehicle. Particularly, the alternator is typically mounted upon the vehicle engine assembly (e.g., the intake manifold portion of the engine) by the use of a mounting bracket and emits a time-varying magnetic field which allows the desired electrical current to be produced.

The emitted magnetic field creates a time-varying force within and/or upon the alternator. The structure of the alternator and/or its mounting brackets respond to this force by vibrating in various modes (e.g., a lateral vibration mode or a mode in which the vibration is substantially parallel to an axis which longitudinally extends along the mounting bracket), which causes the alternator assembly to produce a relatively unpleasant and undesirable noise which is similar to a "whine" and which is typically and undesirably communicated into the vehicle passenger compartment, thereby annoying and/or alarming the vehicle occupants.

The amplitude of the lateral vibration varies in accordance with the operating speed of the alternator. Importantly, the lateral vibration amplitude typically attains a relatively large and significant value at an alternator operating speed which corresponds to about 1550 revolutions per minute and which typically occurs as the engine enters or occupies an idle state. Since the vehicle is substantially stationary during such an engine idle state, thereby reducing and/or eliminating the need for the driver to be focused upon the task of driving or maneuvering the vehicle and reducing the noise which is generated by the engine, tires, and airflow, the undesired "whine" is readily noticed or perceived by the driver and/or passengers of the vehicle.

There is therefore a need for a new and improved alternator mounting bracket which substantially reduces the amplitude or amount of such undesired noise as the engine enters an idle state.

SUMMARY OF THE INVENTION

It is a first object of the present invention to provide an alternator mounting bracket which overcomes some or all of the previously delineated drawbacks of prior alternator mounting brackets.

It is a second object of the present invention to provide an alternator mounting bracket which allows an alternator to be selectively and operatively mounted upon a vehicle engine.

It is a third object of the present invention to provide an alternator mounting bracket which allows an alternator to be selectively and operatively mounted upon a vehicle engine, and which substantially reduces the amount of noise which is produced by the alternator during an engine idling state.

It is a fourth object of the present invention to provide an alternator mounting bracket which allows an alternator to be selectively and operatively mounted upon a vehicle engine, and which causes the noise which is produced by the alternator during the idling of the engine to be substantially imperceptible to a human ear.

According to a first aspect of the present invention an alternator mounting bracket is provided. The alternator mounting bracket includes a relatively planar first portion which is selectively mounted upon a portion of an engine and a substantially thin protruding portion which is selectively adapted to be attached to an alternator, thereby mounting the alternator upon the engine.

According to a second aspect of the present invention a method is provided for reducing the noise which is produced by an alternator of the type which is selectively mounted upon an engine by a bracket. The method includes the step of selectively thinning a portion of the bracket.

These and other features, aspects, and advantages of the present invention will become apparent by reading the following detailed description of the preferred embodiment of the invention and by reference to the following drawings.

DETAILED DESCRIPTION OF THE PREFERRED EMBODIMENT OF THE INVENTION

Figure 1:
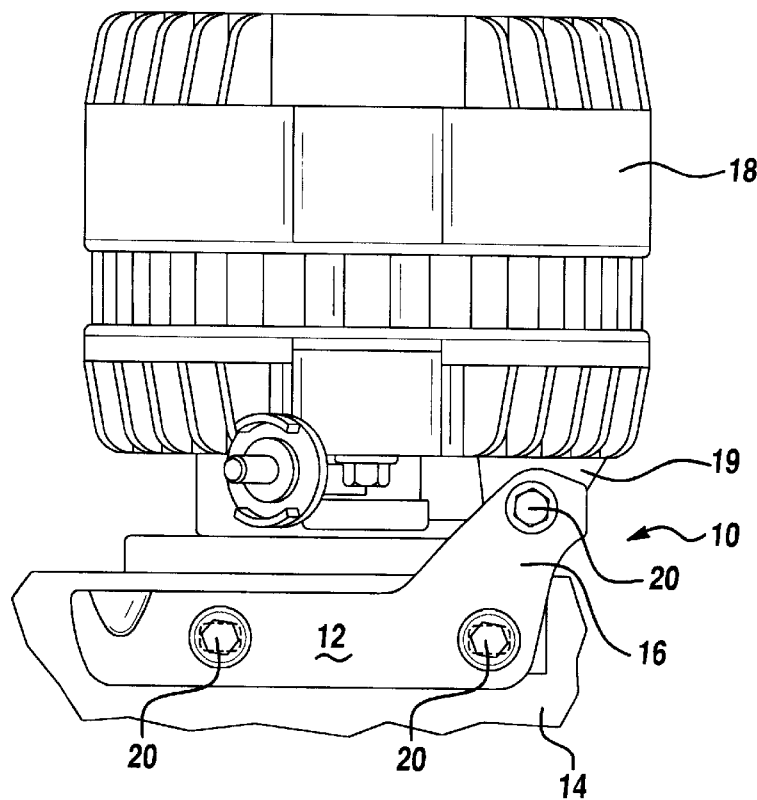
FIG. 1 is a top view of an alternator mounting bracket which is made in accordance with the teachings of the prior art and which is shown in an operative alternator mounting arrangement.

Referring now to FIG. 1, there is shown an alternator mounting bracket 10 which is made in accordance with the teachings of the prior art and which includes a generally planar first portion 12 which is adapted to be selectively mounted upon engine 14 and a relatively thick protruding portion 16 which angularly projects from the first portion 12 and which is adapted to be selectively attached or coupled to an alternator 18. Particularly, portions 12 and 16 are respectively coupled to engine 14 and to alternator 18 by use of substantially identical, conventional, and commercially available fastening members 20 which may, in one nonlimiting embodiment, each comprise a bolt.

Figure 4:
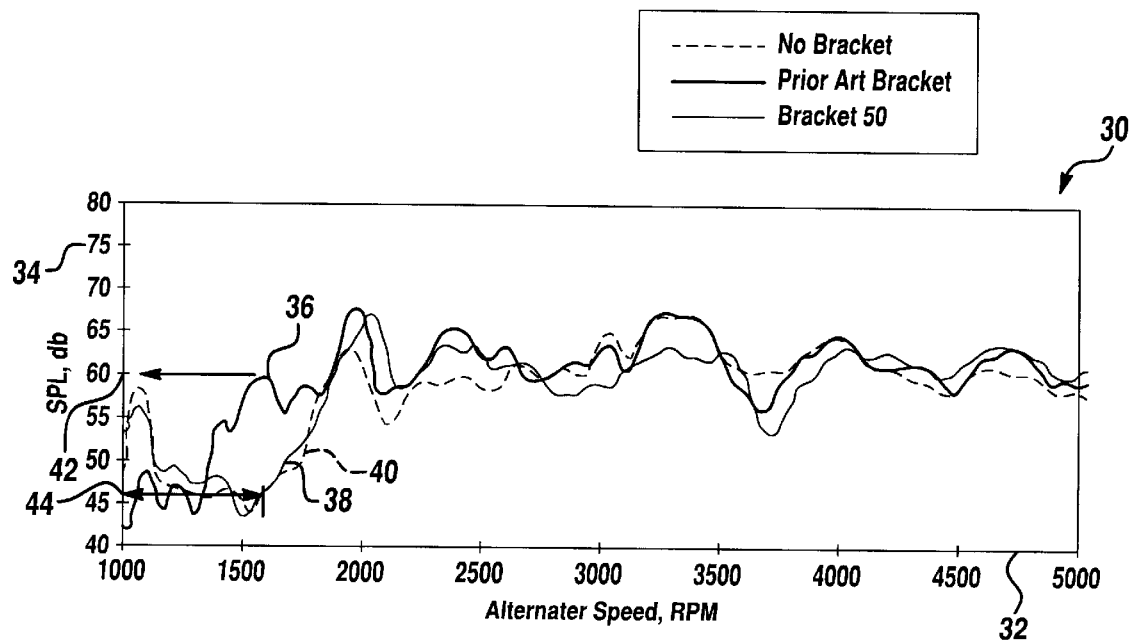
FIG. 4 is a graph illustrating the amount of noise produced by the alternator mounting arrangement which is shown in FIGS. 2 and 3 and the amount of noise respectively produced by various other prior alternator mounting arrangements.

The use of bracket 12, as shown best in graph 30 of FIG. 4, cooperates with and/or causes the alternator to produce undesirable noise as the engine 14 is idling. Graph 30 includes a first axis 32 including several alternator operating speeds and a second axis 34 including measured noise levels emanating from the alternator 18. The various lines 36 and 38 respectively denote interrelationships between the produced alternator noise and the use of bracket 16 and the use of an alternator mounting bracket 50, which is made in accordance with the teachings of the preferred embodiment of the invention. Line 40 represents the noise produced by the alternator 18 without the use of an alternator mounting bracket.

As shown by line 36, the alternator produced noise reaches a relatively large value 42 when the alternator 18 is operating at a speed of about 1550 revolutions per minute, corresponding to the idling of the engine 14. For the reasons which have been previously delineated above, this arrangement is undesirable.

Figure 2:
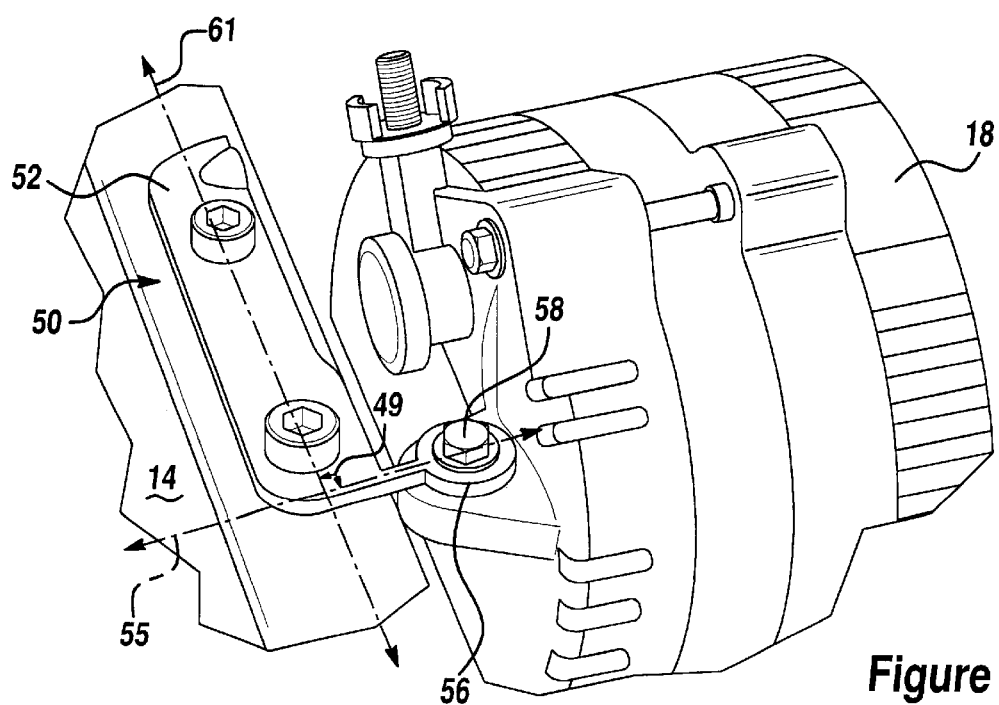
FIG. 2 is a perspective view of an alternator mounting bracket which is made in accordance with the teachings of the preferred embodiment of the invention and which is shown in an operative alternator mounting arrangement.
Figure 3:
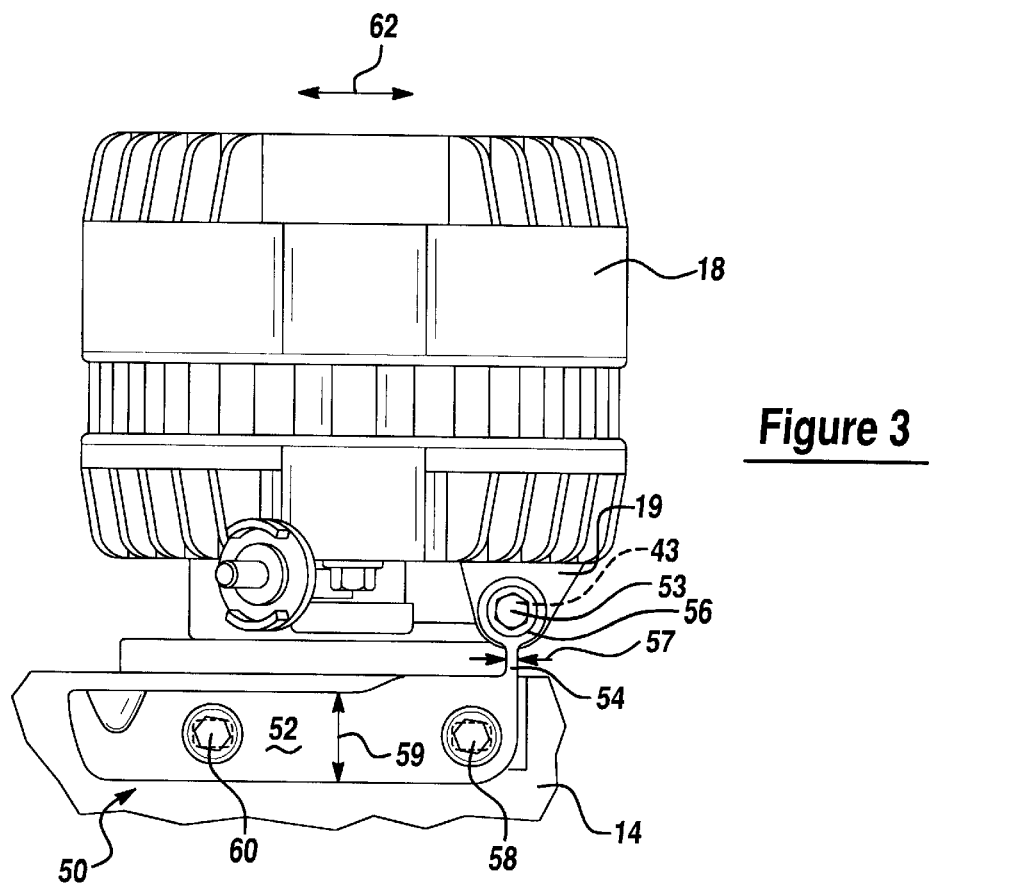
FIG. 3 is a top view of the alternator mounting bracket which is shown in FIG. 2.

Referring now to FIGS. 2 and 3, there is shown an alternator mounting bracket 50 which is made in accordance with the teachings of the preferred embodiment of the embodiment of the invention. Particularly, bracket 50 includes a relatively thick and generally planar body portion 52, and a relatively thin and integrally formed "bridge", arm or protrusion portion 54 which integrally terminates within and/or which integrally forms a generally round portion 56 having an aperture 43. As shown, portion 56 is adapted to be selectively placed upon the bracket attachment flange 19 of the alternator 18. Aperture 43 selectively receives a conventional and commercially available fastener 53, such as a bolt, effective to couple or attach the mounting bracket 50 to the alternator 18. Further, a pair of conventional, substantially identical, and commercially available fasteners 58, 60 (e.g. each fastener is substantially identical to fastener 53), are attached to portion 52, effective to secure the bracket 50 to the engine 14. As shown, portion 52 has a substantial or approximate longitudinal axis of symmetry 61 which is orthogonal to the longitudinal axis of symmetry 55 of portion 54. That is, portion 54 forms a substantial "right angle" 49 with portion 52. In the preferred embodiment of the invention, the width 57 of portion 54 is about one tenth of the width 59 of portion 52. Furthermore, it should be realized that other shapes and sizes of portions 52 and 54 may be utilized provided that the width of the utilized arm or "bridge" portion 54 is relatively "thin" or substantially smaller than the width of the utilized body portion 52. In other alternate embodiments, portion 54 and portion 52 are disposed at different angles with respect to each other (e.g., angles greater than or less than angle 49).

The use of the bracket 50 substantially eliminates or greatly reduces the amount of noise which is generated by the alternator 18 during the idling of the engine 14. Particularly, the relatively thin bridge or protrusion portion 54 is relatively pliant in the lateral or transverse direction(s) (e.g., the directions illustrated by arrow 62). Thus, unlike the prior art bracket 10, bracket 50 affords alternator 18 an increased degree of compliance in the lateral or transverse direction(s). This compliance is effective to substantially reduce the frequency of the undesirable vibration modes or frequencies of alternator 18 which are associated with unpleasant and undesirable noise emissions when engine 14 is in an idling condition. In other words, the stiffness of the mounting bracket 50 is adjusted, or "tuned", to modify the natural frequency of the lateral vibration mode of alternator 18 such that these modes are not excited by magnetic forces in operating RPM range of the alternator 18. Further, the bracket retains sufficient strength and stiffness in the axial direction (i.e., parallel to the axis of the alternator shaft) to provide for the secure attachment of the alternator to the engine, in conjunction with the other mounts (not shown).

That is, as shown best by line 38 of graph 30, the noise which is produced by the alternator as it operates within an operating range of about 1200 to about 1580 revolutions per minute is greatly reduced from the noise which is produced in this alternator operating range by use of the bracket 16 which is made in accordance with the prior art. Particularly, as shown in FIG. 4, the noise amplitude 42 which is produced by alternator 18 when mounted to engine 14 by bracket 16 is substantially equal to about 60 decibels at an alternator operating speed of about 1550 revolutions per minute, which substantially represents an engine idling condition. However, when alternator 18 is mounted to engine 14 by bracket 50, the noise amplitude level 44 is reduced by about fifteen decibels to a substantially imperceptible level (i.e., substantially imperceptible to a vehicle occupant's ear) of about 45 decibels at the same operating speed of about 1550 revolutions per minute. As further shown in FIG. 4, the level of alternator noise 44, which is produced when using bracket 50, is about equal to the level produced by the alternator 18 without the use of any alternator mounting bracket, at an alternator operating speed of about 1550 revolutions per minute.

It is to be understood that the invention is not limited to the exact construction or method or RPM range which has been previously delineated above, but that various changes and modifications may be made without departing from the spirit and the scope of the following claims.

What is claimed is:

1. An alternator mounting bracket having a relatively wide and generally planar body portion and a generally thin protruding portion which is selectively attached to the alternator.

2. The alternator mounting bracket of claim 1 wherein said body portion has a first width and wherein said protruding portion has a second width which is about one tenth of said first width.

3. The alternator mounting bracket of claim 2 wherein said protruding portion orthogonally projects from said body portion.

4. The alternator mounting bracket of claim 3 wherein said protruding portion includes a generally round attachment portion having an aperture which selectively receives a fastening member.

5. The alternator mounting bracket of claim 4 wherein said alternator includes a mounting flange and wherein said protruding portion is selectively disposed upon said mounting flange and wherein said fastening member selectively attaches said protruding portion to said flange.

6. A mounting bracket for use with an alternator of the type which is selectively deployed upon an engine which selectively occupies an idle state, the alternator producing a certain amount of noise when said engine selectively occupies said idle state, said mounting bracket comprising a first portion which is selectively attached to said engine; and a second portion which is selectively attached to said alternator, thereby allowing said alternator to be attached to said engine without increasing said certain amount of noise.

7. The mounting bracket of claim 6 wherein said first portion is generally flat and relatively thick.

8. The mounting bracket of claim 7 wherein said second portion is relatively thin.

9. The mounting bracket of claim 8 wherein said first portion has a first width and wherein said second portion has a second width which is about one tenth of said first width.

10. The mounting bracket of claim 9 wherein said first portion has a first longitudinal axis of symmetry and wherein said second portion has a second longitudinal axis of symmetry.

11. The mounting bracket of claim 10 wherein said second longitudinal axis of symmetry is substantially orthogonal to said first longitudinal axis of symmetry.

12. The mounting bracket of claim 11 wherein said second portion includes a generally round portion which includes an aperture which selectively receives a fastening member.

13. The mounting bracket of claim 12 wherein said fastening member comprises a bolt.

14. The mounting bracket of claim 6 wherein said noise is reduced to a level which is substantially imperceptible to a vehicle occupant's ear.

15. The mounting bracket of claim 6 wherein said noise is reduced to a level substantially identical to that produced by the alternator without the use of said bracket.

16. A method for reducing the noise produced by an alternator of the type which is selectively mounted to an engine by a bracket, said method comprising the step of:

selectively thinning a certain portion of the bracket.

17. The method of claim 16 wherein said bracket has a first portion which is selectively coupled to the engine and a second portion which is coupled to the alternator and wherein said second portion comprises said certain portion.

18. The method of claim 17 wherein said first portion has a first width and wherein said second portion has a second width, said method further comprising the step of causing said second width to be about one tenth of said first width.

19. The method of claim 18 further comprising the step of causing said second portion to orthogonally project from said first portion.

20. The method of claim 19 further comprising causing said first and second portions to have respective and longitudinal axes of symmetry and causing said longitudinal axis of symmetry of said first portion to be orthogonal to said longitudinal axis of symmetry of said second portion.

\* \* \* \* \*